(12) United States Patent
Yang

(10) Patent No.: US 10,026,288 B2
(45) Date of Patent: *Jul. 17, 2018

(54) ONE TIME USE TAG

(71) Applicant: Xiao Hui Yang, Saratoga, CA (US)

(72) Inventor: Xiao Hui Yang, Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,651

(22) Filed: Jan. 3, 2017

(65) Prior Publication Data

US 2017/0116837 A1   Apr. 27, 2017

Related U.S. Application Data

(63) Continuation of application No. 14/184,786, filed on Feb. 20, 2014, now Pat. No. 9,564,033.

(60) Provisional application No. 61/767,147, filed on Feb. 20, 2013.

(51) Int. Cl.
*G08B 13/14* (2006.01)
*G08B 13/24* (2006.01)
*G06K 19/077* (2006.01)

(52) U.S. Cl.
CPC ... *G08B 13/2434* (2013.01); *G06K 19/07749* (2013.01); *G06K 19/07758* (2013.01); *G08B 13/1463* (2013.01)

(58) Field of Classification Search
CPC ............ G08B 13/2434; G08B 13/1463; G06K 19/07749; G06K 19/00758; G06K 19/07758; E05B 73/0017
USPC ..................................................... 340/572.8
See application file for complete search history.

(56) References Cited

U.S. PATENT DOCUMENTS

| | | |
|---|---|---|
| 3,708,835 A | 1/1973 | Bienz |
| 4,196,424 A | 4/1980 | Williamson |
| 4,263,697 A | 4/1981 | Speedie |
| 4,441,233 A | 4/1984 | Swift |
| 4,506,415 A | 3/1985 | Swift |
| 4,986,457 A | 1/1991 | Faris |
| 5,337,503 A | 8/1994 | Goby |
| 5,364,141 A | 11/1994 | King |
| 5,524,463 A | 6/1996 | Schenkel et al. |
| 5,538,289 A | 7/1996 | Cassis, III |
| 5,568,951 A | 10/1996 | Morgan |
| 5,570,080 A | 10/1996 | Inoue |
| 5,627,520 A | 5/1997 | Grubbs et al. |
| 5,717,382 A | 2/1998 | Cooper |
| 5,797,196 A | 8/1998 | Stanfield |
| 5,856,782 A | 1/1999 | Sasagawa et al. |

(Continued)

*Primary Examiner* — John A Tweel, Jr.
(74) *Attorney, Agent, or Firm* — Brian W. Foxworthy; Robert R. Waters; Waters Law Group, PLLC

(57) ABSTRACT

Embodiments of the current invention entail a highly visible tag that can be attached to a product at a highly visible location on the product at a store, but can easily be removed once the purchaser buys the product and takes it home. Once the purchaser gets the product home, they can remove it themselves and use it in public. Once the tag is removed, it cannot be reattached by the consumer. Depending on the store policy, the product may not be returned, or an extra fee charged for returning the garment, or other similar policies. Absence of a tag makes it clear that the buyer has removed the tag and provides an indication that the product, such as a garment has been used or worn in public. The tag is most effective for products that are used in public, such as garments. The tag may carry EAS technology.

15 Claims, 4 Drawing Sheets

(56) References Cited

U.S. PATENT DOCUMENTS

| | | |
|---|---|---|
| 5,945,909 A | 8/1999 | Kolton |
| 5,949,336 A | 9/1999 | Deschenes et al. |
| 5,959,532 A | 9/1999 | Fujiuchi |
| 5,969,613 A | 10/1999 | Yeager et al. |
| 5,995,003 A | 11/1999 | Rogers |
| 6,025,781 A | 2/2000 | Deschenes |
| 6,052,876 A | 4/2000 | Hogan et al. |
| 6,188,320 B1 | 2/2001 | Kolton et al. |
| 6,326,890 B1 | 12/2001 | Costa |
| 6,535,130 B2 | 3/2003 | Nguyen et al. |
| 6,624,753 B2 | 9/2003 | Elston |
| 6,724,311 B1 | 4/2004 | Kolton et al. |
| 6,731,212 B2 | 5/2004 | Hirose |
| D493,739 S | 8/2004 | Copen |
| D494,487 S | 8/2004 | Sayegh |
| D502,419 S | 3/2005 | Copen |
| D503,900 S | 4/2005 | Sayegh |
| D504,634 S | 5/2005 | Sayegh |
| D504,839 S | 5/2005 | Sayegh |
| D505,349 S | 5/2005 | Sayegh |
| 6,933,847 B2 | 8/2005 | Febelman et al. |
| D509,454 S | 9/2005 | Sayeh |
| 7,062,823 B2 | 6/2006 | Copen |
| 7,084,764 B2 | 8/2006 | McHugh et al. |
| 7,148,805 B2 | 12/2006 | Hogan |
| 7,183,914 B2 | 2/2007 | Norman et al. |
| 7,227,467 B2 | 6/2007 | Feibelman |
| 7,249,401 B2 | 7/2007 | Copen |
| 7,286,055 B2 | 10/2007 | Girvin et al. |
| 7,311,253 B2 | 12/2007 | Garner |
| 7,342,495 B2 | 3/2008 | Sayegh |
| D566,598 S | 4/2008 | Sayegh |
| D567,128 S | 4/2008 | Sayegh |
| D578,030 S | 10/2008 | Yang |
| 7,518,521 B2 | 4/2009 | Feibelman et al. |
| 7,595,733 B2 | 9/2009 | Spagna |
| 7,626,501 B2 | 12/2009 | Feibelman |
| 7,671,741 B2 | 3/2010 | Lax et al. |
| 7,724,146 B2 | 5/2010 | Nguyen et al. |
| 7,808,390 B2 | 10/2010 | Sayegh |
| 7,969,310 B2 | 7/2011 | Sayegh |
| 8,269,632 B2 | 11/2012 | Hesch, Jr. et al. |
| 9,564,033 B2 * | 2/2017 | Yang .................. G08B 13/2434 |
| 2002/0154014 A1 | 10/2002 | Elston |
| 2008/0048030 A1 | 2/2008 | Garner |
| 2009/0045258 A1 | 2/2009 | Sabeta |
| 2009/0115615 A1 | 5/2009 | Bleckmann et al. |
| 2010/0050487 A1 | 3/2010 | Weightman et al. |
| 2010/0315237 A1 | 12/2010 | Yang |
| 2012/0323807 A1 | 12/2012 | Sabeta |

* cited by examiner

ONE TIME USE TAG

CROSS REFERENCE TO RELATED APPLICATIONS

This application is a continuation application of U.S. application Ser. No. 14/184,786, filed on Feb. 2, 2014. U.S. application Ser. No. 14/184,786 claims priority to U.S. Provisional Application 61/767,147 filed on Feb. 20, 2013. The entirety of U.S. application Ser. No. 14/184,786 and U.S. Provisional Application 61/767,147, including both the figures and specifications, are incorporated herein by reference.

FIELD OF THE INVENTION

This invention relates to the prevention of the fraudulent return of purchased goods. More specifically, this invention relates to the prevention of the return of garments which have been purchased, worn, and then returned to the store after having been worn.

BACKGROUND OF THE INVENTION

Theft of goods in the retail environment is a serious concern. Theft cuts into the margins of a business making it more difficult for a business to compete and succeed. One type of theft is fraudulently returned garments. This type of theft involves purchasing a garment, perhaps a more expensive high end garment, and wearing it at least once. After the garment has been worn, it is fraudulently returned to the retail outlet where it was purchased. This allows the purchaser to get the good of the product without paying for it. This frequently occurs when a person purchases a more expensive article of clothing for a particular occasion, wears the garment, and then returns it.

SUMMARY FOR EMBODIMENTS OF THE INVENTION

Embodiments of the current invention entail a highly visible tag that can be attached to the garment at the store, but can easily be removed once the purchaser buys the garment and takes it home. Once the purchaser gets the garment home, they can remove it themselves and wear it. Once the tag is removed, it can not be reattached by the consumer. Depending on the store policy, the garment may not be returned, or there may be an extra fee for returning the garment, or other similar policies. The use of a tag makes it clear that the buyer has removed the tag and provides an indication that the garment has been worn in public.

In at least one embodiment the tag consists of an elongated plastic piece having a head and a lanyard extending from the head. The head has a relatively large flat face and a hub extending from behind the face. The face provides a large surface for a logo or for a statement about removal of the tag, etc. The hub tapers as it extends away from the face and is sized to be pressed through an aperture on garment such as a buttonhole. The hub has an aperture through it generally aligned with the lanyard and sized to accept the insertion of the lanyard.

The lanyard has several cleats along its length. When the free end of the lanyard is passed through the aperture in the hub and pulled, these cleats pass through the aperture as well and prevent the lanyard from being pulled back out of the aperture in the hub. A short distance along its length from the head, the lanyard has a tab and break lines formed along each side of the tab across the width of the lanyard. This tab and the break lines to each side of it facilitate the separation of the lanyard into sections. Pulling the tab separates the lanyard into a stub section still attached to the head and a tail section passing through the aperture. The tab section itself may also become separated from both of the other sections of lanyard. Once the lanyard is separated, the tag may pressed out of the aperture to allow the garment to be worn. If necessary the tail section of the lanyard may be pulled the rest of the way through the aperture in the hub of the head of the tag.

In some embodiments of the tag, the head will enclose an EAS device. The EAS device would interact with a larger EAS system to provide security and tracking functions. Due to size and cost factors, the EAS device would most likely be passive, but active EAS devices would also be possible. In some cases, the EAS device may actually be a dummy device which produces a rattle within the body of the tag to deceive would be thieves that an EAS device is housed in the tag. Of course, in the latter case the dummy device would not interact with the larger EAS system.

BRIEF DESCRIPTION OF THE DRAWINGS

Additional utility and features of the invention will become more fully apparent to those skilled in the art by reference to the following drawings, which illustrate some of the primary features of preferred embodiments.

DETAILED DESCRIPTION OF EMBODIMENTS

Figure 1:
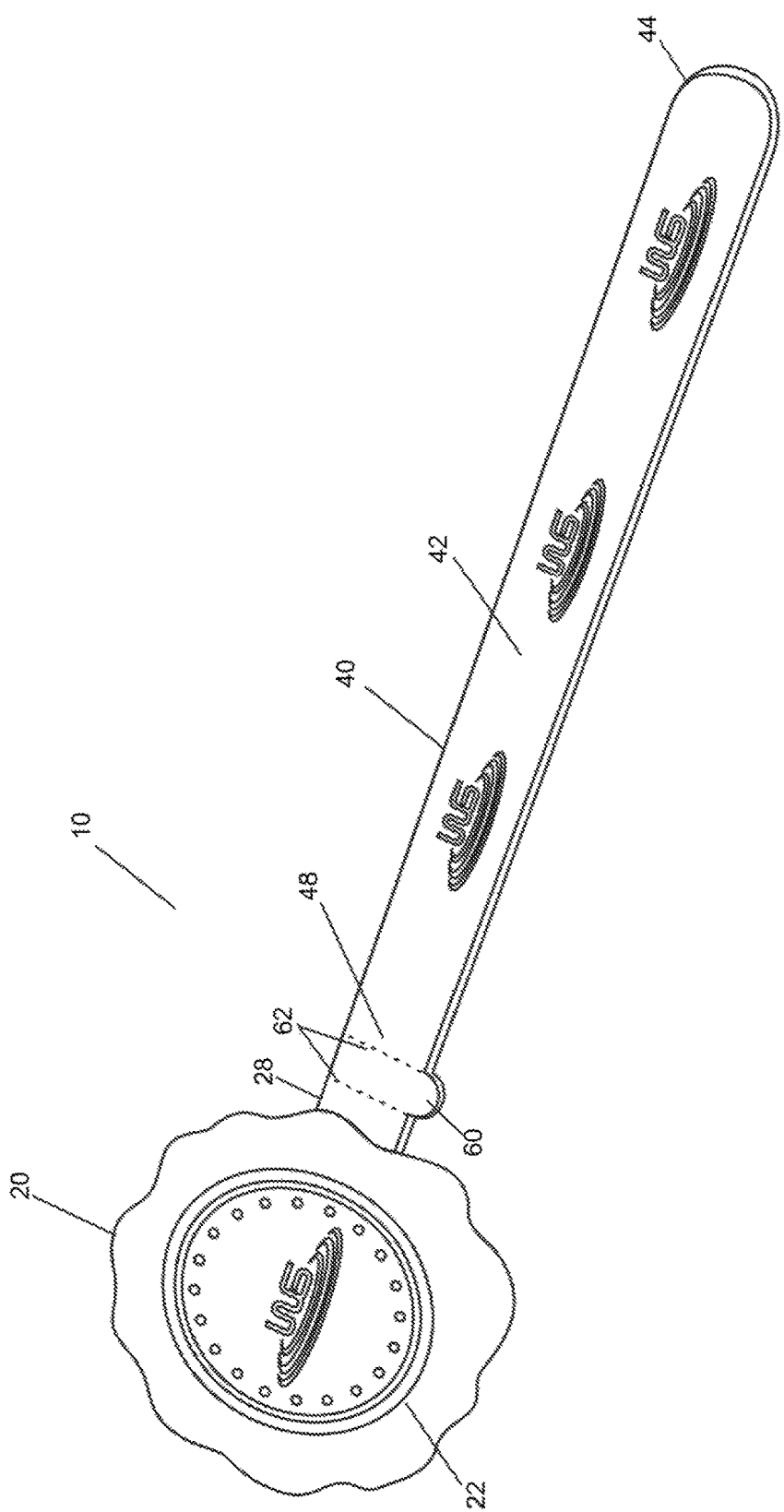
FIG. 1 is a top perspective view of an embodiment of the tag before application to an object.

FIG. 1 is a top perspective view of an embodiment of tag 10 before application to an object. Tag 10 has a head 20 with lanyard 40 extending from it. Head 20 in the embodiment shown in FIG. 1 is round and has a large face appearing like a seal 22. Seal face 22 is large enough to allow a cosmetic logo to be applied to it and also large enough to prevent it from passing all the way through an aperture in clothing, etc. Lanyard 40 extends from head 20 and is comprised of three parts. These three parts are stub 28 which attaches to head 20 and extends from it, tab 60 and tail 42. Stub 28 is relatively short and extends a short way from head 20. Tab 60 is attached to the end of stub 28 and tail 42 of lanyard 40 is attached to tab 60. Where tab 60 attaches to stub 28 and tail 42 of lanyard 40, two break lines 62 run across the width of lanyard 40. As will be discussed later, these break lines 62 assist in the separation of the sections of lanyard 40.

Figure 2:
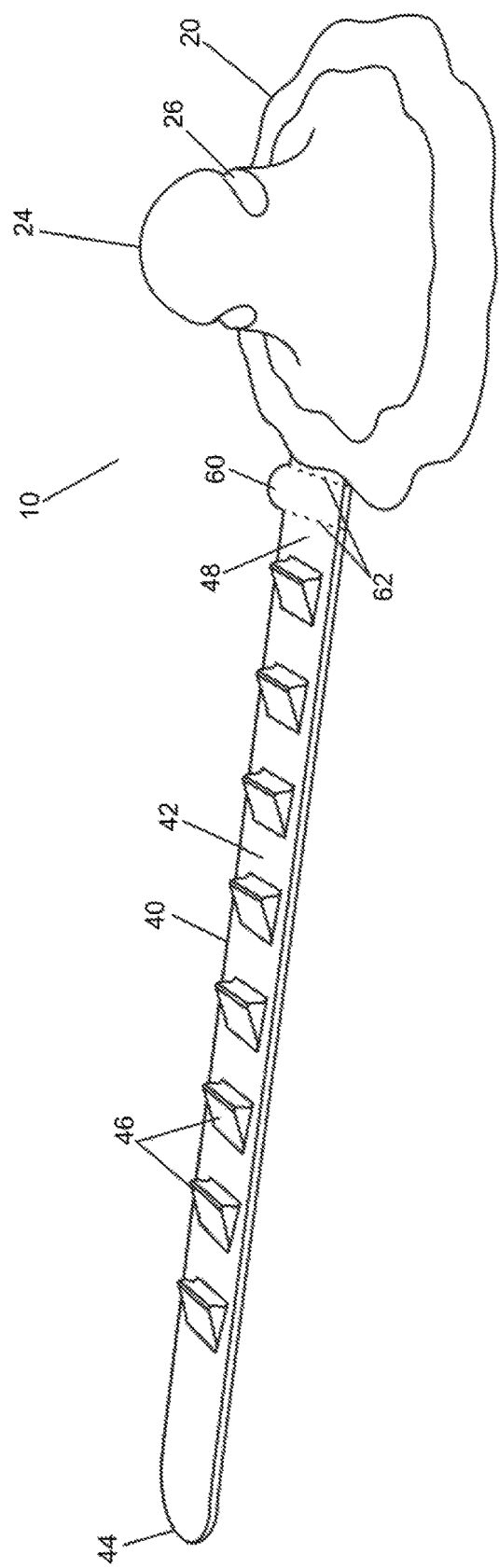
FIG. 2 is a bottom perspective view of an embodiment of the before application to an object.

FIG. 2 is a bottom perspective view of the embodiment of tag 10 shown in FIG. 1 before application to an object. In FIG. 2, hub 24 extends upward from the back of head 20 of tag 10. Aperture 26 passes through hub 24 and is generally aligned with lanyard 40. Hub 24 is intended to pass through an aperture in a garment, such as a button hole or similar aperture. Lanyard 40 with its three sections is also visible in FIG. 2. Cleats 46 are located on the back side of tail 42 of lanyard 40. Several cleats 46 are spaced at regular intervals and run for a good section of tail 42. Tail 42 terminates in free end 44 of lanyard 40. To install tag 10 on an object hub 24 of head 20 is pressed through a button hole, or other aperture, in the object and free end 44 of lanyard 40 is passed through aperture 26 in hub 24. As free end 44 is pulled, more of tail 42 passes through aperture 26. As tail 42 passes through aperture 26, cleats 46 pass through aperture 26 and prevent tail 42 from being removed from aperture 26. This keeps tag 10 in location on the object being protected.

Figure 3:
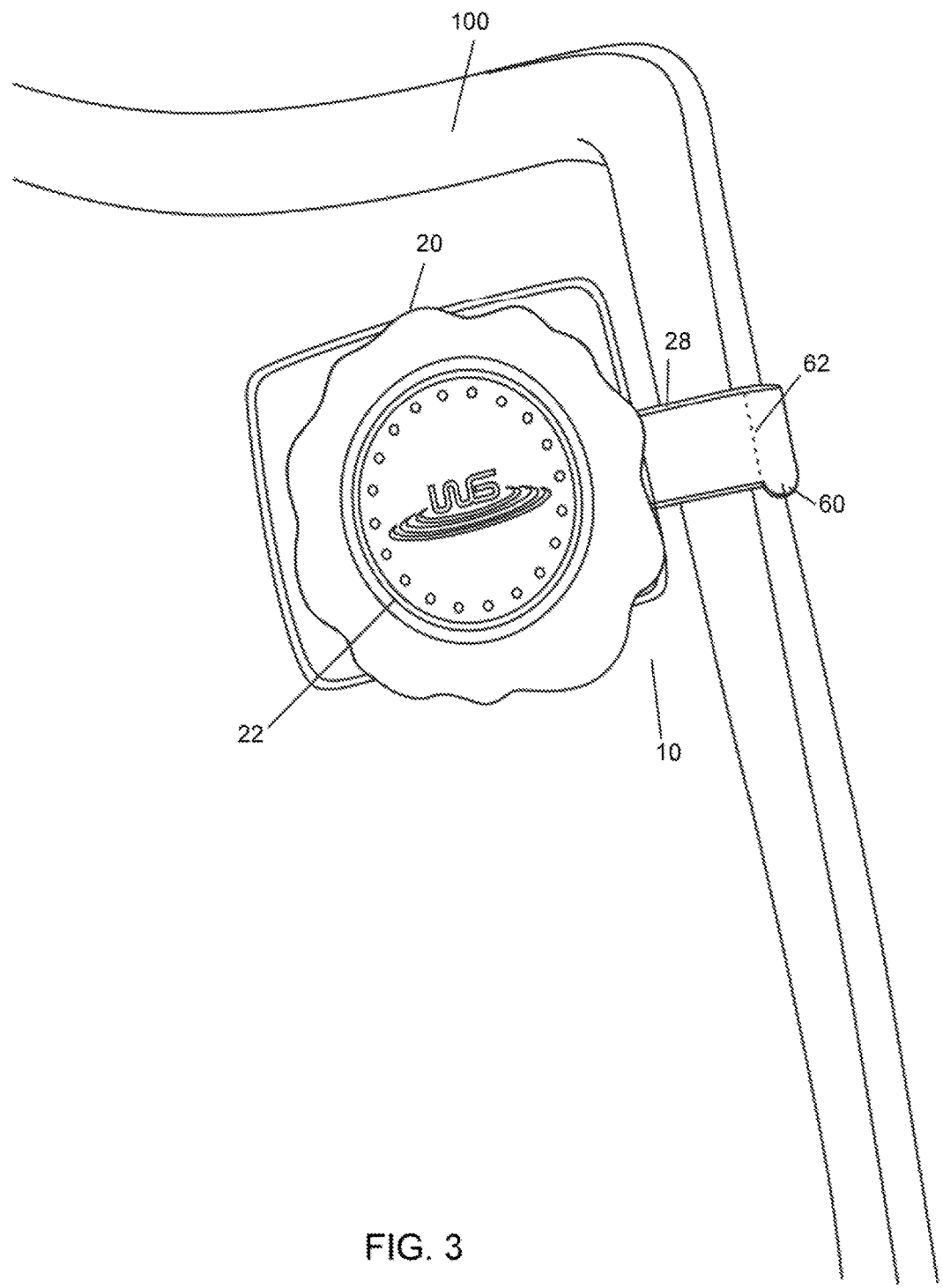
FIG. 3 is a front perspective view of an embodiment of the tag applied to an object.
Figure 4:
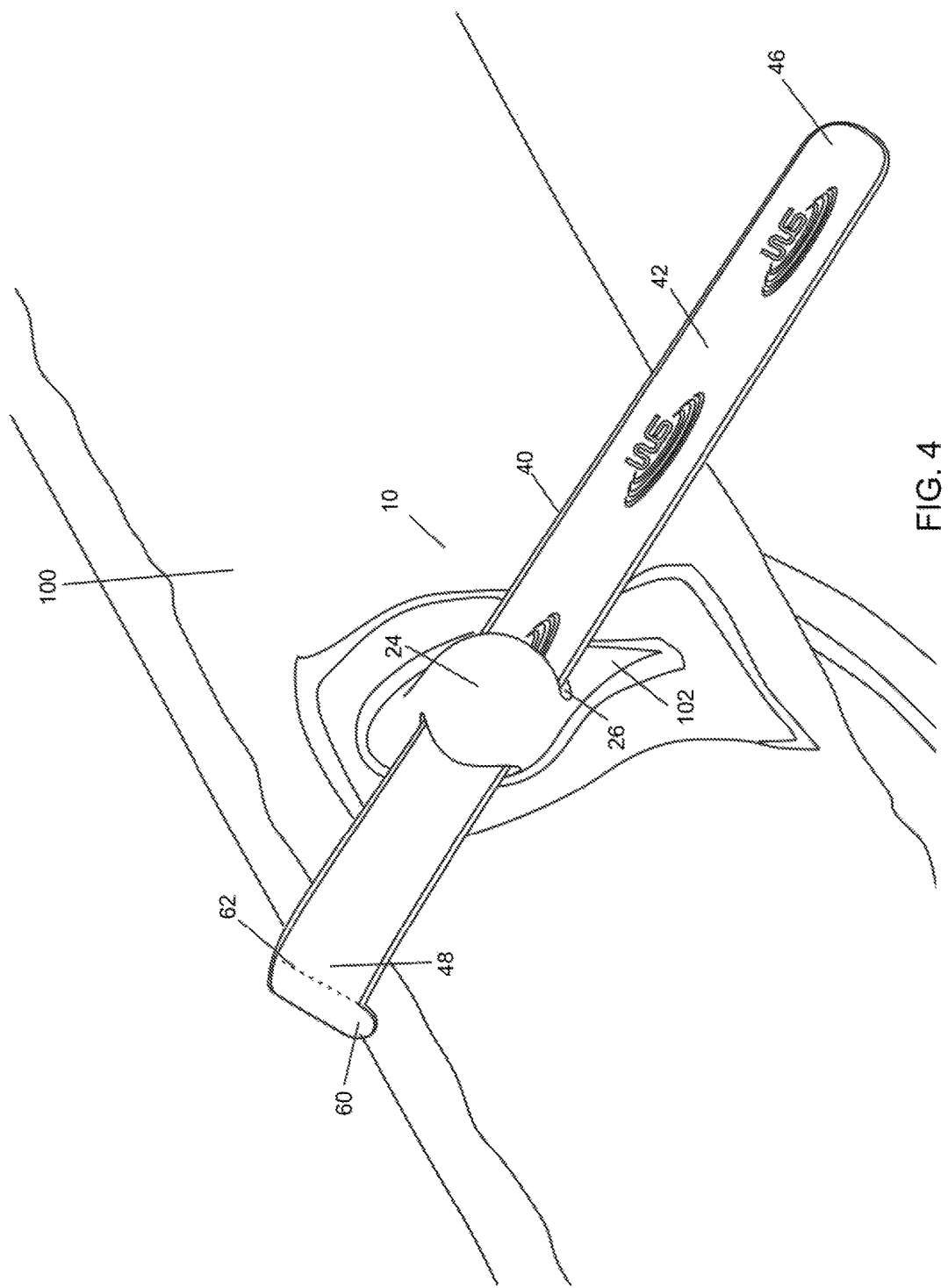
FIG. 4 is a back perspective view of an embodiment of the tag applied to an object.

FIG. 3 is a front perspective view of tag 10 applied to object 100, and FIG. 4 is a back perspective view of tag 10 applied to object 100. In the embodiments of FIGS. 3 and 4, object 100 is shown as a garment but could be a shoe or other product, as well. Head 20 of tag 10 is highly visible and prevents the wearing of garment 100 in a public fashion. This prevents a person from wearing a purchased garment, or other product, 100 in public and then returning it. If a person should decide that they want to wear the garment in public and remove tag 10, this can easily be accomplished by pulling tab 60. Break lines 62 formed by a line of perforations along across the width of lanyard 40 to either side of tab 60 facilitate the separation of the segments of lanyard 40. Once tag 10 is removed it cannot be replaced and its absence serves as a clear indication that the garment has been worn in public. While perforations are shown in the figures, the same effect could be accomplished by reducing the thickness of lanyard 40 at the desired locations.

In FIG. 4 hub 24 may be seen protruding through aperture 102 in object 100. Lanyard 40 is inserted through aperture 26 in hub 24 and is pulled through to maintain tag 10 in position. Attached end 48 of lanyard 40 attaches to tab 60. Again perforation line 62 running across the width of lanyard 40 facilitates the separation of tag 60 from tail 42 or stub 28. Once this separation occurs tag 10 may be removed from the garment. Once the separation is accomplished tag 10 may simply be pushed through the aperture, or tail 42 of lanyard 20 may be pulled all the way through aperture 26 in hub 24 of tag 10. This further facilitates the removal of tag 10 from garment, or object, 100.

As previously mentioned in the summary section, tag 10, may also have comprise EAS electronics. Returning to FIG. 2, head 20 comprises EAS electronic components. In the embodiment of FIG. 2, the EAS electronic components comprise passive EAS element 70. EAS element 70 is of the core and coil type of passive element which produces a detectable signal when subjected to an interrogation field produced by a larger EAS system, but other types of passive elements, such as acousto-magnetic labels, could be used. Also, with the current state of miniaturization technology and manufacturing technology, active EAS electronics could also be employed on tag 10. These EAS electronics could be powered by electro-magnetic fields, or onboard power supplies such as batteries, which would power processor chips, communication elements, location other monitoring elements, etc.

It is to be understood that the embodiments and arrangements set forth herein are not limited in their application to the details of construction and arrangement of the components set forth in the description and illustrated in the drawings. Rather, the description and the drawings provide examples of the embodiments envisioned, but the invention is not limited to the specific embodiments. The embodiments disclosed herein are further capable of other embodiments and of being practiced and carried out in various ways, including various combinations and sub-combinations that may not have been explicitly disclosed. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the invention be regarded as including such equivalent constructions.

I claim:

1. A single use tag for the prevention of fraudulent return of a product, said tag comprising:
    a head, said head having a lanyard extending from it and a hub;
    said hub having an aperture through it;
    said lanyard having a fixed end attached to said head, a free end, and at least one cleat along its length and located distal from said fixed end;
    wherein, said aperture, said lanyard, and said at least one cleat on said lanyard are sized to allow the insertion of said free end of said lanyard and said at least one cleat on said lanyard through said aperture to form a loop and said at least one cleat is sized, shaped, and located on said lanyard, and said aperture is sized, to allow said cleat to pass through said aperture when said loop is formed, but to not pass back through said aperture to open said loop;
    wherein, once said at least one cleat passes through said aperture, said loop only being opened by separating said lanyard between said fixed end of said lanyard and said aperture in said hub.

2. The single use tag of claim 1, wherein:
    said at least cleat comprises a plurality of cleats along said lanyard, each said cleat being sized, shaped, and located on said lanyard to allow said cleat to pass through said aperture when said loop is formed, but to not pass back through said aperture to open said loop, said plurality of cleats allowing the formation of loops of different sizes.

3. The single use tag of claim 1, wherein:
    said lanyard comprises a stub extending from said fixed end attached to said head, a pull tab attached to said stub, and a tail attached to said pull tab, said lanyard having a break line between said stub and said pull tab and a break line between said pull tab and said tail, said break lines allowing the separation of said lanyard without the use of a tool;
    said at least one cleat being located on said tail of said lanyard.

4. The single use tag of claim 2, wherein:
    said break lines are comprised of perforations through said lanyard.

5. The single use tag of claim 2, wherein:
    said break lines are comprised of lines of reduced thickness through said lanyard.

6. The single use tag of claim 1, wherein:
    said head further comprises a display face, said display face providing a highly visible feature apparent on the product.

7. The single use tag of claim 1, wherein;
    said head further comprises electronic article surveillance electronics.

8. The single use tag of claim 7, wherein:
    said electronic article surveillance electronics comprise a passive electronic article surveillance element.

9. The single use tag of claim 8, wherein:
    said passive electronic article surveillance element is a core and coil style of passive electronic article surveillance.

10. A method for the prevention of fraudulent return of a product, said method comprising:
- attaching a single use tag to the product in a location on the product that is highly visible during use of the product;
- selling said product;
- requiring the intact presence of said single use tag for return of said product;
- said single use tag removable by the purchaser of said product;
- said single use tag comprising a head, said head having a lanyard extending from it and a hub;
  - said hub having an aperture through it;
  - said lanyard having a fixed end attached to said head, a free end, and at least one cleat along its length and located distal from said fixed end;
  - wherein, said aperture, said lanyard, and said at least one cleat on said lanyard are sized to allow the insertion of said free end of said lanyard and said at least one cleat on said lanyard through said aperture to form a loop and said at least one cleat is sized, shaped, and located on said lanyard, and said aperture is sized, to allow said cleat to pass through said aperture when said loop is formed, but to not pass back through said aperture to open said loop;
  - wherein, once said at least one cleat passes through said aperture, said loop only being opened by separating said lanyard between said fixed end of said lanyard and said aperture in said hub.

11. The method of claim 10, wherein:
- on said single use tag, said at least cleat comprises a plurality of cleats along said lanyard, each said cleat being sized, shaped, and located on said lanyard to allow said cleat to pass through said aperture when said loop is formed, but to not pass back through said aperture to open said loop, said plurality of cleats allowing the formation of loops of different sizes.

12. The method of claim 10, wherein:
- on said single use tag, said lanyard comprises a stub extending from said fixed end attached to said head, a pull tab attached to said stub, and a tail attached to said pull tab, said lanyard having a break line between said stub and said pull tab and a break line between said pull tab and said tail, said break lines allowing the separation of said lanyard without the use of a tool;
- said at least one cleat being located on said tail of said lanyard.

13. The method of claim 10, further comprising;
- electronically monitoring said tag, wherein said head further comprises electronic article surveillance electronics.

14. The method of claim 13, wherein:
- said electronic article surveillance electronics comprise a passive electronic article surveillance element.

15. The single use tag of claim 14, wherein:
- said passive electronic article surveillance element is a core and coil style of passive electronic article surveillance.

* * * * *